United States Patent
Hsu et al.

(10) Patent No.: US 9,467,003 B2
(45) Date of Patent: Oct. 11, 2016

(54) DAMPING CHARGING DEVIDE

(71) Applicants: Fu-Tzu Hsu, Taipei (TW); Chieh-Sen Tu, New Taipei (TW)

(72) Inventors: Fu-Tzu Hsu, Taipei (TW); Chieh-Sen Tu, New Taipei (TW)

( * ) Notice: Subject to any disclaimer, the term of this patent is extended or adjusted under 35 U.S.C. 154(b) by 251 days.

(21) Appl. No.: 14/307,859

(22) Filed: Jun. 18, 2014

(65) Prior Publication Data
US 2015/0372528 A1 Dec. 24, 2015

(51) Int. Cl.
*H02J 7/00* (2006.01)
*H02J 7/02* (2016.01)

(52) U.S. Cl.
CPC ...................... *H02J 7/025* (2013.01)

(58) Field of Classification Search
USPC ......................................... 320/108
See application file for complete search history.

(56) References Cited

U.S. PATENT DOCUMENTS

| | | | |
|---|---|---|---|
| 6,516,153 B2* | 2/2003 | Honda | H05B 41/325 315/241 P |
| 2003/0102845 A1* | 6/2003 | Aker | H02J 7/0042 320/139 |
| 2012/0235508 A1* | 9/2012 | Ichikawa | H02J 7/0021 307/104 |
| 2013/0127398 A1* | 5/2013 | Xu | H02J 7/0072 320/103 |
| 2013/0134945 A1* | 5/2013 | Xu | H01M 10/5006 320/136 |
| 2013/0141032 A1* | 6/2013 | Xu | H02J 7/007 320/103 |

* cited by examiner

*Primary Examiner* — Mohammed Alam
(74) *Attorney, Agent, or Firm* — WPAT, PC; Justin King

(57) ABSTRACT

A damping charging device includes a power output unit connectable to an electrical energy generating device to regulate a voltage of electrical energy output by the electrical energy generating device and then output a voltage-regulated electric power; a control circuit maintaining the electric power output by the power output unit in a constant-current and constant-voltage state; a damping inductor connected to an anode of a capacitor battery to be charged; and a high-frequency oscillation switch connected to a cathode of the capacitor battery. The damping inductor includes a silicon steel core having inductance that increases with increased frequency and an amorphous silicon core having inductance that increases with decreased frequency. The actuated high-frequency oscillation switch causes the damping inductor to store and release electrical energy alternately at high frequency, and the damping inductor releases electrical energy having frequency response to offset capacitive reactance and charge the capacitor battery efficiently.

16 Claims, 7 Drawing Sheets

DAMPING CHARGING DEVIDE

FIELD OF THE INVENTION

The present invention relates to a damping charging device, which is able to convert continuous direct current of no frequency response to electrical energy having frequency response for charging a capacitor battery, so that the capacitor battery can be fully charged faster and no electrical energy loss occurs in the course of charging.

BACKGROUND OF THE INVENTION

FIG. 1 shows a conventional charging device 11, which has an end connectable to an electrical energy generating device 10 and another end connectable to a capacitor battery 12. Electrical energy output by the electrical energy generating device 10 can be charged via the charging device 11 to the capacitor battery 12, so that the capacitor battery 12 can supply electric power to a load 13 for the same to work. The electrical energy generating device 10 can be a renewable energy generator or a power supply unit.

The conventional charging device 11 includes a transformer 14, a control circuit 15 and a rectifier diode 16. The transformer 14 is able to increase or decrease a voltage of the electrical energy output by the electrical energy generating device 10. The control circuit 15 is used mainly to control and maintain the electric power transmitted by the charging device 11 at a constant current and a constant voltage. The rectifier diode 16 can convert the transmitted electric power to a direct current (DC) of no frequency response.

The transformer 14 shown in FIG. 1 functions to regulate the voltage of the electrical energy output by the electrical energy generating device 10 and then outputs voltage-regulated electric power. Therefore, the transformer 14 can be considered as a power supply and it has an internal resistance r. As opposed to the transformer 14, the capacitor battery 12 can be considered as a load and it produces resistance R in the process of being charged. In the course of charging, electric power is charged into the capacitor battery 12 in the form of voltage, so as to increase the electric potential level of the capacitor battery 12. Therefore, the capacitor battery 12 will produce heat in the course of being charged. When the transformer 14 outputs continuous electric power to charge the capacitor battery 12, it will encounter the condition proposed by the maximum power transfer theorem (MPTT). That is, when the resistance R of the capacitor battery 12 is the same as the internal resistance r of the transformer 14 in the electric power transmission path, a maximum electric power output can be obtained. That is, $P_{outmax} = \frac{1}{2} P_{in}$. Therefore, one half of the electrical energy is consumed in the circuit to result in very poor charging efficiency.

When using the conventional charging device 11 shown in FIG. 1 to charge the capacitor battery 12, a considerably long time is needed to fully charge the capacitor battery 12 due to a capacitive reactance thereof, i.e. a static electricity that resists the voltage change at two ends of the capacitor. Further, when the transformer 14 outputs electric power of a relatively large current, the capacitor battery 12 is subject to burnout and the charging work could not be completed.

SUMMARY OF THE INVENTION

A primary object of the present invention is to provide a damping charging device that can charge a load faster without the problem stated in the maximum power transfer theorem.

To achieve the above and other objects, the damping charging device provided according to the present invention converts electric power to electrical energy having frequency response for charging a capacitor battery instead of charging the capacitor battery with continuous electric power of no frequency response to increase the electric potential level of the capacitor battery.

The damping charging device of the present invention includes a power output unit, a control circuit, a damping inductor, and a high-frequency oscillation switch. The power output unit is connectable to an electrical energy generating device, and a capacitor battery to be charged is connected at an anode to the damping inductor and at a cathode to the high-frequency oscillation switch.

The power output unit is able to increase or decrease a voltage of electrical energy output by the electrical energy generating device and then outputs a voltage-regulated electric power. The control circuit controls and maintains the electric power output by the power output unit in a constant-current and constant-voltage state. The damping inductor includes a silicon steel core, an amorphous silicon core and a coil. The silicon steel core has an inductance value that increases with increased frequency, and the amorphous silicon core has an inductance value that decreases with increased frequency. When the high-frequency oscillation switch is actuated, the damping inductor is caused to store and release electric power alternately at high frequency, so as to offset the capacitive reactance. Therefore, the damping inductor is able to release electrical energy having frequency response for charging the capacitor battery.

The power output unit can be a transformer or an AC-to-DC power supply.

The high-frequency oscillation switch can be a fast diode with characteristics of fast gate.

The electrical energy generating unit can be a renewable energy generator or a grid power source.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 2:
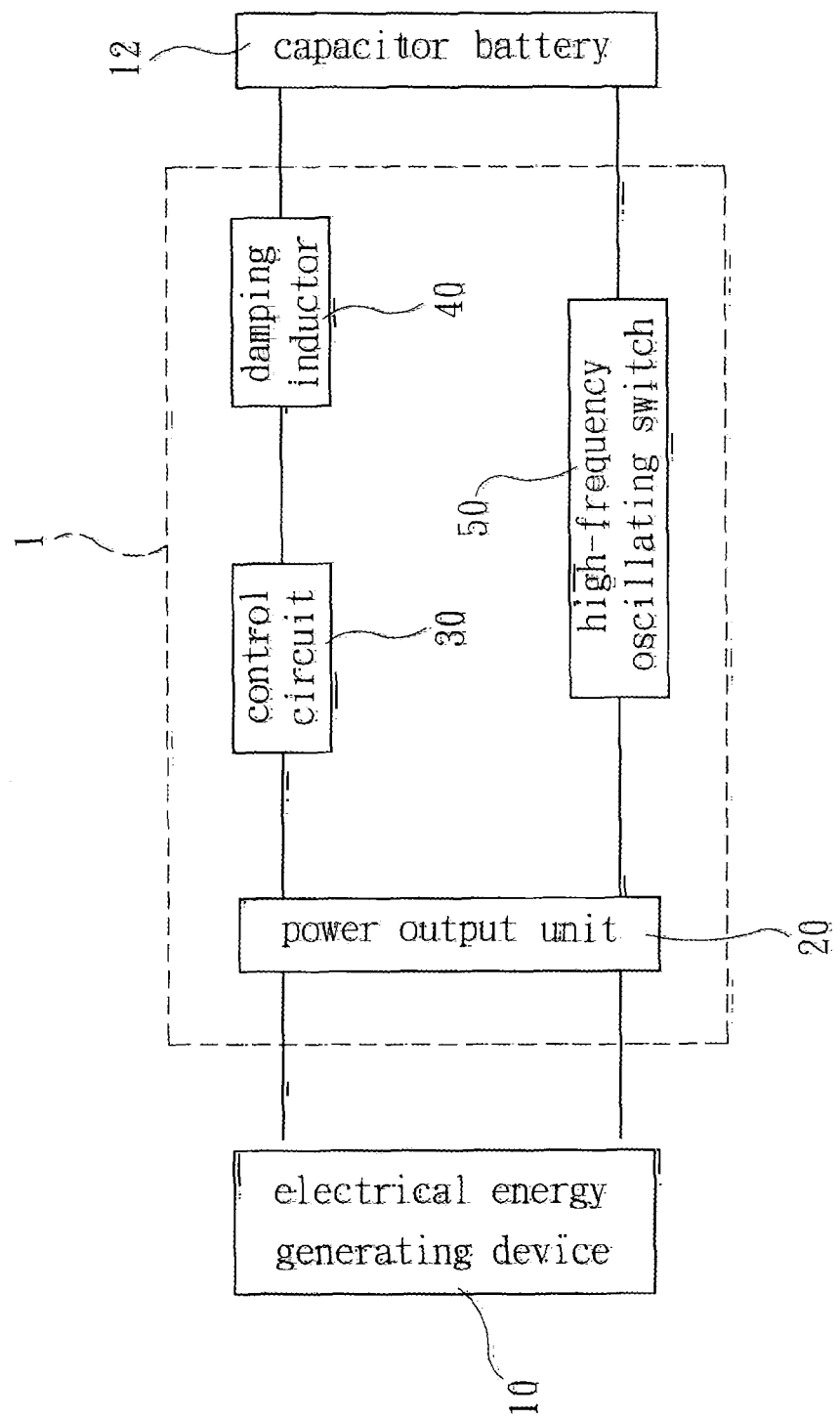
FIG. 2 is a block diagram showing a damping charging device according to a first embodiment of the present invention being used to charge a capacitor battery.
Figure 3:
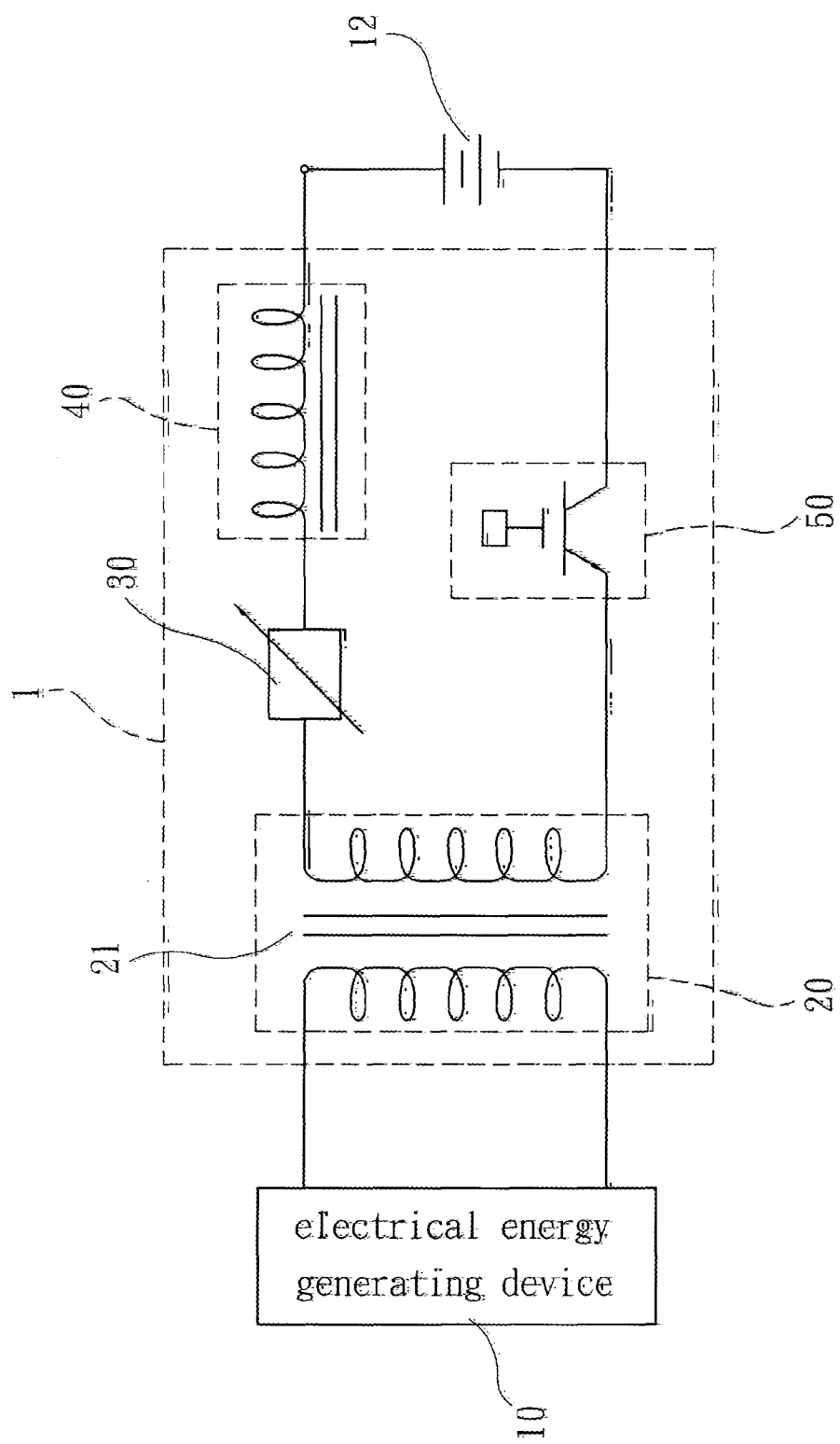
FIG. 3 is a circuit diagram showing the damping charging device according to the first embodiment of the present invention being used to charge a capacitor battery.

Please refer to FIGS. 2 and 3, which are block and circuit diagrams, respectively, showing a damping charging device 1 according to a first embodiment of the present invention. As shown, in the first embodiment, the damping charging device 1 includes a power output unit 20, a control circuit 30, a damping inductor 40, and a high-frequency oscillating switch 50. The power output unit 20 is connectable to an electrical energy generating device 10, and is used to increase or decrease a voltage of electrical energy output by the electrical energy generating device 10 and then outputs a voltage-regulated electric power. A capacitor battery 12 to be charged by the damping charging device 1 is connected at an anode to the damping inductor 40 and at a cathode to the high-frequency oscillating switch 50. The electrical energy generating device 10 can be a renewable energy generator or a grid power source.

The control circuit 30 is electrically connected to the power output unit 20, and is used to control and maintain the electric power output by the power output unit 20 in a constant-current and constant-voltage state, so that electric current can be stably transmitted. The control circuit 30 is a known technique.

Figure 6:
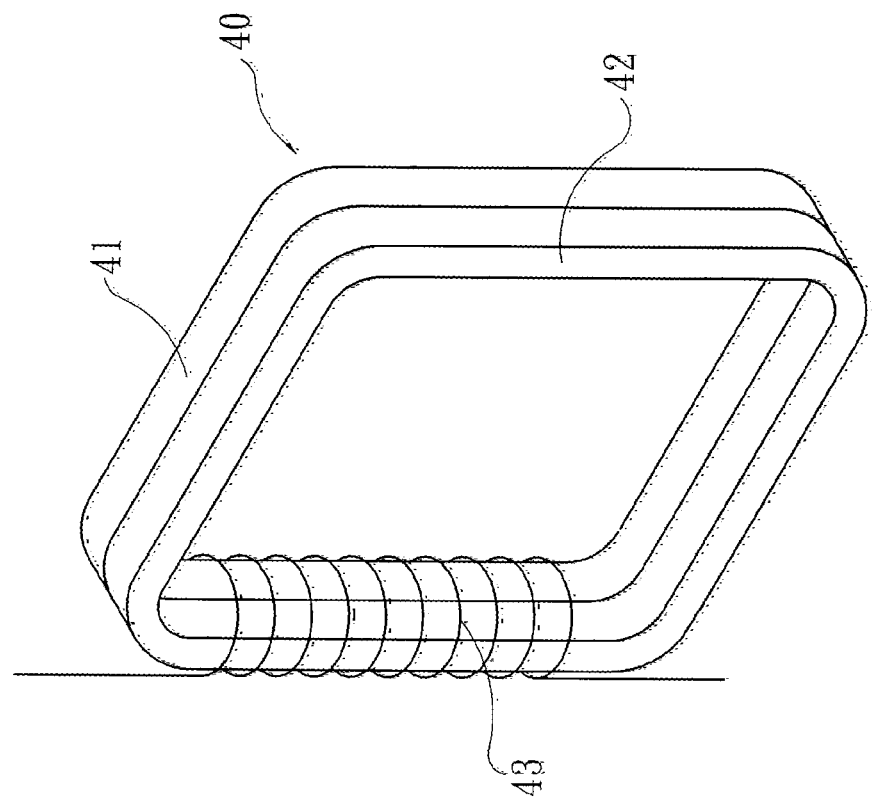
FIG. 6 shows a second configuration for the damping inductor included in the damping charging device of the present invention.
Figure 5:
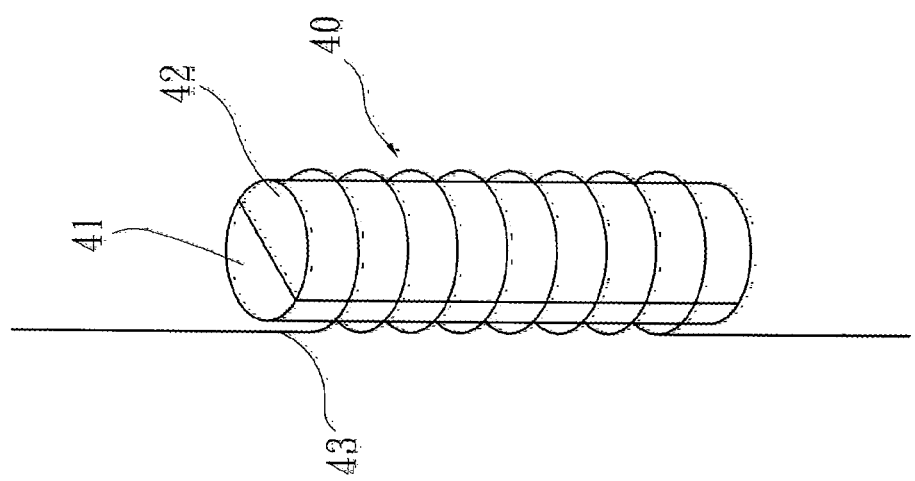
FIG. 5 shows a first configuration for a damping inductor included in the damping charging device of the present invention.

The damping inductor 40 is electrically connected to the control circuit 30. Please refer to FIGS. 5 and 6. The damping inductor 40 includes a silicon steel core 41, an amorphous silicon core 42, and a coil 43. The silicon steel core 41 and the amorphous silicon core 42 are attached to each other side-by-side with the coil 43 wound on them. The silicon steel core 41 has an inductance value that increases with increased frequency. On the other hand, the amorphous silicon core 42 has an inductance value that decreases with increased frequency. It is known a capacitor battery has larger capacity also has higher capacitive reactance. When the damping inductor 40 has an electric current flows therethrough, it produces self-oscillation to offset the capacitive reactance of the capacitor battery 12, so that the damping inductor 40 does not have a rising temperature to cause loss of electrical energy. In FIG. 5, both of the silicon steel core 41 and the amorphous silicon core 42 are bar-shaped. In FIG. 6, both of the silicon steel core 41 and the amorphous silicon core 42 are closed-loop.

Figure 1:
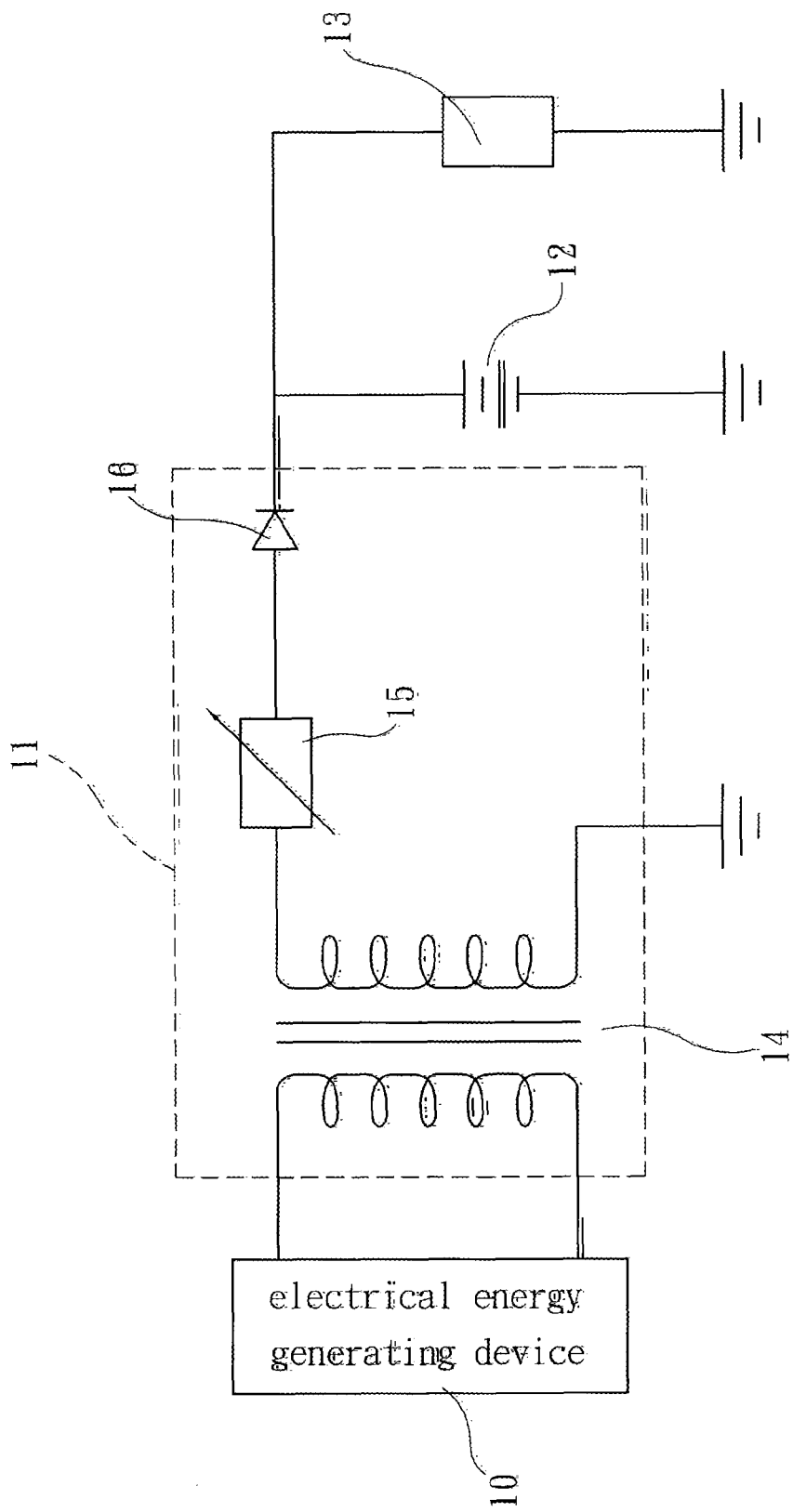
FIG. 1 is a circuit diagram showing a conventional charging device being used to charge a capacitor battery.

When the high-frequency oscillation switch 50 is actuated, the damping inductor 40 is caused to store and release electrical energy alternately at high frequency. When the high-frequency oscillation switch 50 is ON, the damping inductor 40 is caused to store electrical energy. On the other hand, when the high-frequency oscillation switch 50 is OFF, the damping inductor 40 is caused to release the stored electrical energy to charge the capacitor battery 12. The electrical energy released from the damping inductor 40 is electrical energy with frequency response. Therefore, the damping charging device 1 according to the first embodiment of the present invention charges the capacitor battery 12 with electrical energy having frequency response, and is therefore different from the conventional charging device 11 shown in FIG. 1 that charges the capacitor battery 12 with continuous electric power of no frequency response to increase the electric potential level of the capacitor battery 12.

Since the damping charging device 1 of the present invention charges the capacitor battery 12 with electrical energy having frequency response, the capacitor battery 12 can be fully charged faster. Since the capacitive reactance is offset, it is able to increase the frequency of charging to its highest possible limit without causing rising temperature to the capacitor battery 12.

In the present invention, the power output unit 20 can be a transformer 21, which is capable of increasing or decreasing the voltage of the electrical energy output by the electrical energy generating device 10 and then outputs a voltage-regulated electric power. Or, the power output unit 20 can be an AC-to-DC power supply for directly outputting a power source. Please refer to FIG. 4. The high-frequency oscillation switch 50 can be a fast diode 51 with characteristics of fast gate. The fast diode 51 can be, for example, a Schottky diode that can reach the highest possible limit of frequency.

Figure 4:
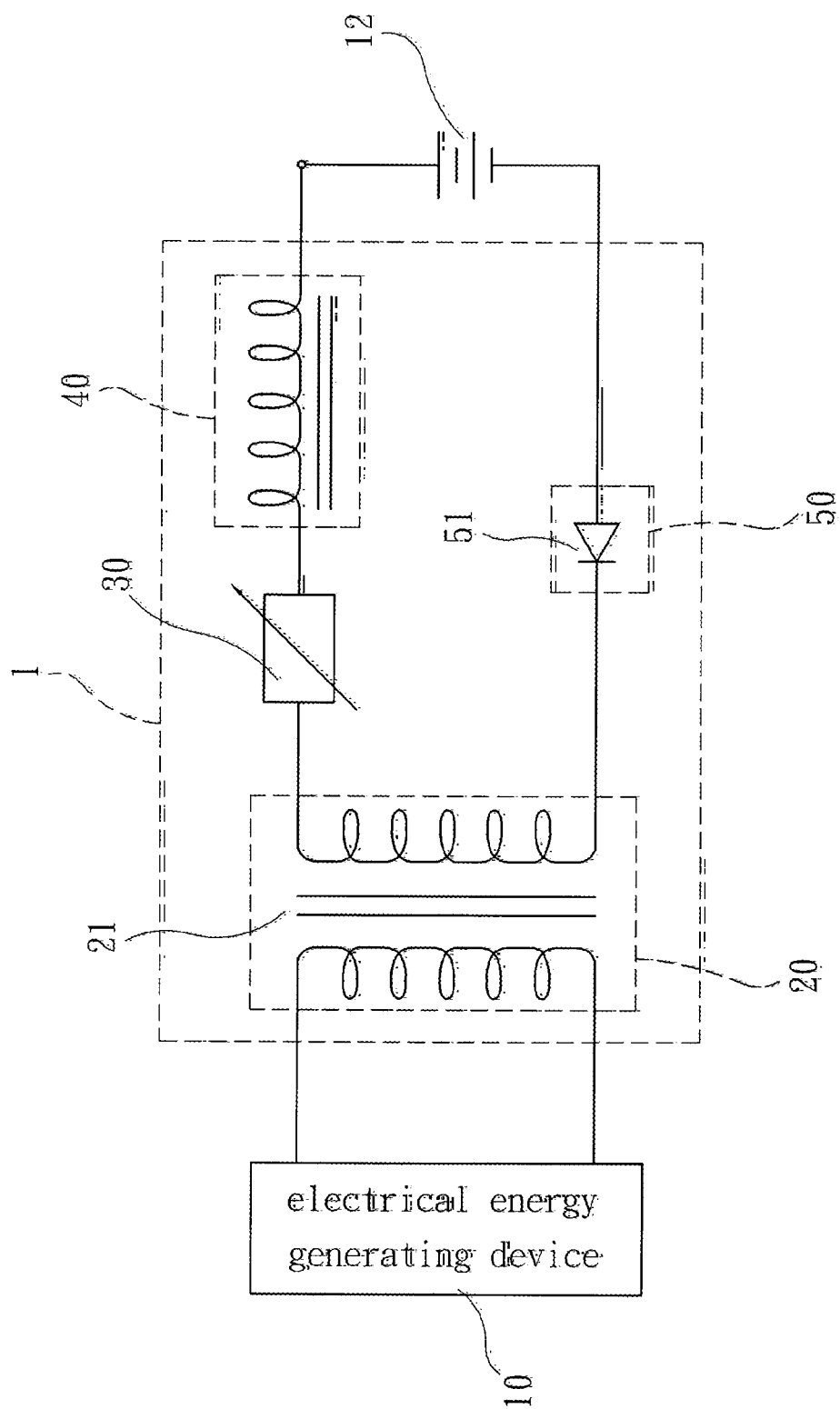
FIG. 4 is a circuit diagram similar to that in FIG. 3 but includes a fast diode to replace a high-frequency oscillating switch in FIG. 3.
Figure 7:
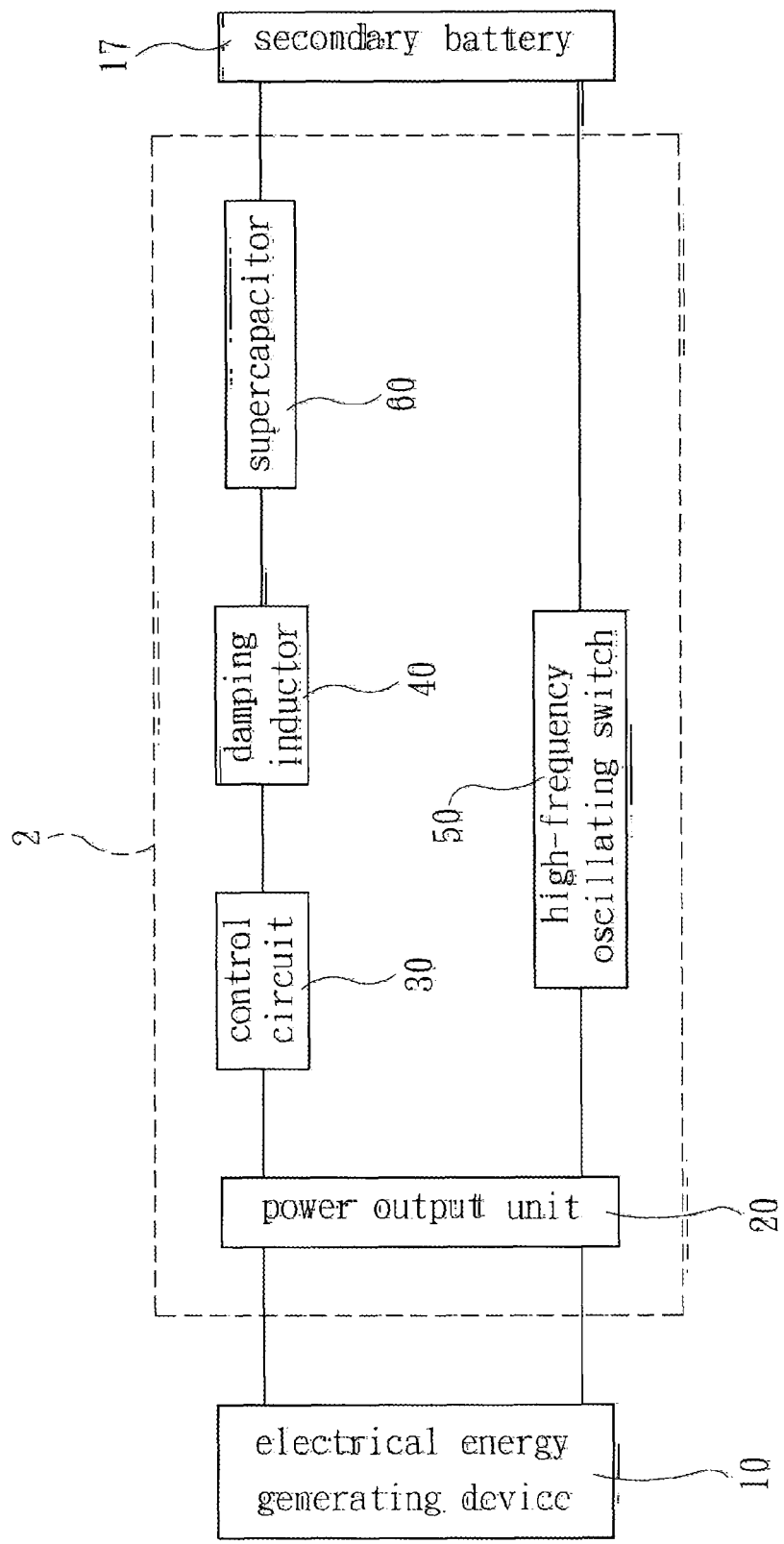
FIG. 7 is a block diagram showing a damping charging device according to a second embodiment of the present invention being used to charge a secondary battery.
Figure 8:
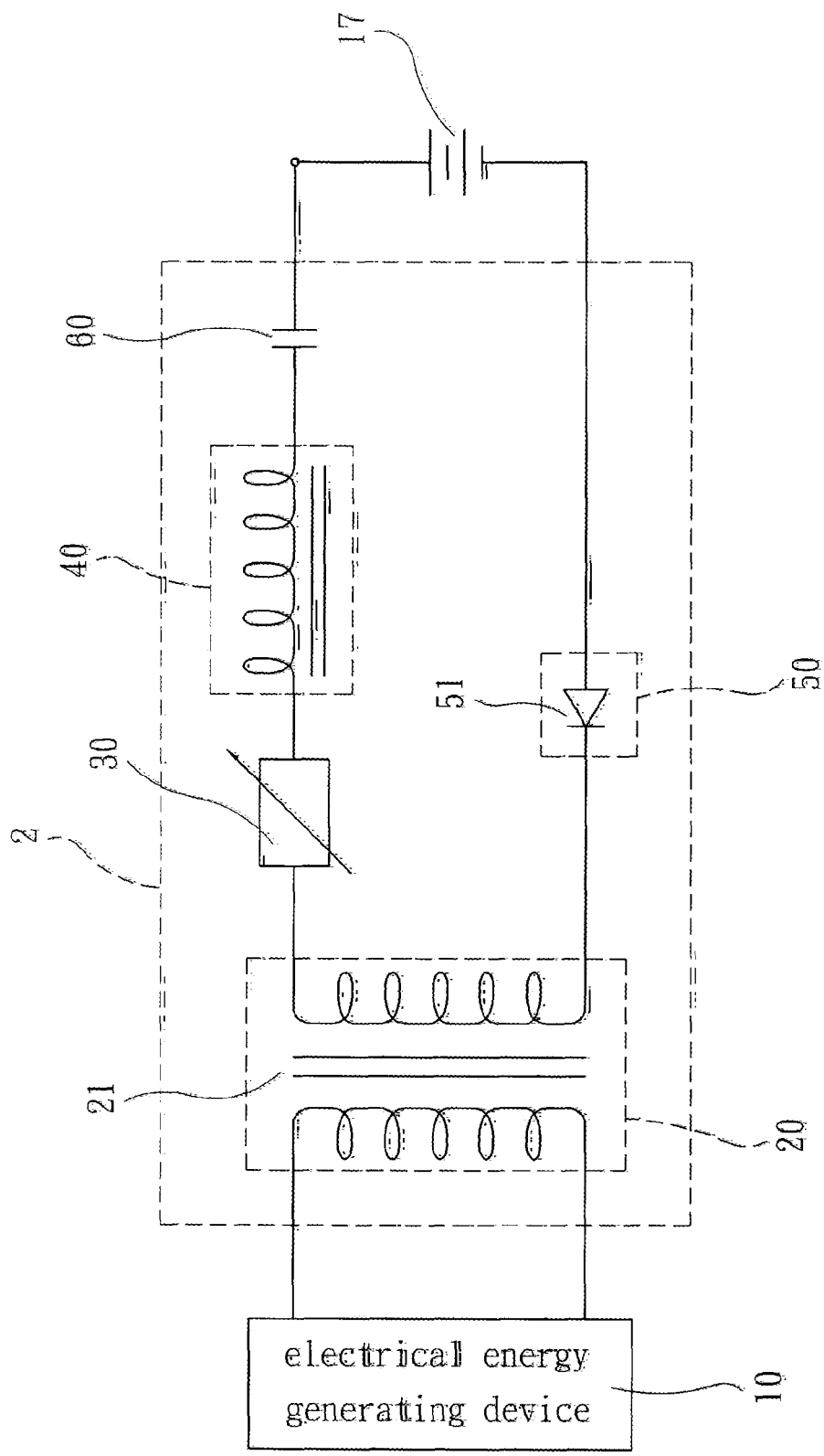
FIG. 8 is a circuit diagram showing the damping charging device according to the second embodiment of the present invention being used to charge a secondary battery.

The damping charging device 1 shown in FIGS. 2 to 4 is mainly used to charge a capacitor battery 12. The capacitor battery 12 has a capacitive character and can produce a damping effect. However, in the case the damping charging device 1 is used to charge a secondary battery, the secondary battery is subject to burnout due to an excessively high frequency of the electrical energy output by the damping charging device 1. Please refer to FIGS. 7 and 8, which show a damping charging device 2 according to a second embodiment of the present invention configured to overcome the above problem. In the second embodiment, in addition to the power output unit 20, the control circuit 30, the damping inductor 40 and the high-frequency oscillation switch 50, the damping charging device 2 further includes a large-capacity supercapacitor 60. The supercapacitor 60 and the damping inductor 40 are connected in series to together form a damper. With a damping effect produced by the supercapacitor 60, the damping charging device 2 can be used to charge a secondary battery 17.

In the process of storing and releasing electrical energy, the damping inductor 40 produces self-oscillation to avoid a rising temperature thereof and therefore does not cause loss of electrical energy. When the damping charging device 1 of the present invention operates, the electrical energy, i.e. electron flow, released from the damping inductor 40 for charging the capacitor battery 12 is an electrical energy having frequency response. Therefore, the condition of $P_{outmax} = \frac{1}{2} P_{in}$ according to the maximum power transfer theorem (MPTT) does not exist in the present invention. That is, with the damping charging device 1 of the present invention, all the electrical energy released from the damping inductor 40, except a very minor transmission loss of current in the circuit, is charged into the capacitor battery 12. According to the present invention, electrical energy, or electron flow, having frequency response is used to charge the capacitor battery. Therefore, the damping charging device 1 of the present invention is different from the conventional charging device 11 shown in FIG. 1 that charges the capacitor battery 12 with continuous electric power of no frequency response to increase the electric potential level of the capacitor battery 12.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A damping charging device for charging a capacitor battery, comprising:
   a power output unit being connectable to an electrical energy generating device and being capable of increasing or decreasing a voltage of electrical energy output by the electrical energy generating device and then outputting a voltage-regulated electric power;
   a control circuit being electrically connected to the power output unit to control and maintain the electric power output by the power output unit in a constant-current and constant-voltage state;
   a damping inductor being electrically connected at an end to the control circuit and at another end to an anode of the capacitor battery; the damping inductor being composed of a silicon steel core, an amorphous silicon core and a coil, wherein the silicon steel core and the amorphous silicon core are attached to each other side-by-side with the coil wound on them, the silicon steel core has an inductance value that increases with increased frequency, and the amorphous silicon core has an inductance value that decreases with increased frequency; and
   a oscillation switch being connected to a cathode of the capacitor battery;
   wherein when the oscillation switch is actuated, the damping inductor is caused to store and release electrical energy alternately, and therefore, the damping inductor releases electrical energy having frequency response to charge the capacitor battery.

2. The damping charging device as claimed in claim 1, wherein the power output unit is a transformer capable of increasing or decreasing the voltage of the electrical energy output by the electrical energy generating device.

3. The damping charging device as claimed in claim 1, wherein the power output unit is an AC-to-DC power supply.

4. The damping charging device as claimed in claim 2, wherein the electrical energy generating device is selected from the group consisting of a renewable energy generator and a grid power source.

5. The damping charging device as claimed in claim 1, wherein the high-frequency oscillation switch is a fast diode with characteristics of fast gate.

6. The damping charging device as claimed in claim 5, wherein the fast diode is a Schottky diode.

7. The damping charging device as claimed in claim 1, wherein the silicon steel core and the amorphous silicon core are bar-shaped.

8. The damping charging device as claimed in claim 1, wherein the silicon steel core and the amorphous silicon core are closed-loop.

9. A damping charging device for charging a secondary battery, comprising:
   a power output unit being connectable to an electrical energy generating device and being capable of increasing or decreasing a voltage of electrical energy output by the electrical energy generating device and then outputting a voltage-regulated electric power;
   a control circuit being electrically connected to the power output unit to control and maintain the electric power output by the power output unit in a constant-current and constant-voltage state;
   a damping inductor being electrically connected at an end to the control circuit, composed of a silicon steel core, an amorphous silicon core, and a coil, wherein the silicon steel core and the amorphous silicon core are attached to each other side-by-side with the coil wound on them, the silicon steel core has an inductance value that increases with increased frequency, and the amorphous silicon core having an inductance value that decreases with increased frequency;
   a superconductor being serially connected at an end to the damping inductor and at another end to an anode of the secondary battery, wherein the superconductor and the damping inductor together forms a damper; and
   a oscillation switch being connected to a cathode of the secondary battery;
   wherein when the oscillation switch is actuated, the damping inductor is caused to store and release electrical energy alternately, and therefore, the damping inductor releases electrical energy having frequency response, and with a damping effect produced by the supercapacitor, the electrical energy released from the damping inductor is used to charge the secondary battery.

10. The damping charging device as claimed in claim 9, wherein the power output unit is a transformer capable of increasing or decreasing the voltage of the electrical energy output by the electrical energy generating device.

11. The damping charging device as claimed in claim 9, wherein the power output unit is an AC-to-DC power supply.

12. The damping charging device as claimed in claim 9, wherein the electrical energy generating device is selected from the group consisting of a renewable energy generator and a grid power source.

13. The damping charging device as claimed in claim 9, wherein the high-frequency oscillation switch is a fast diode with characteristics of fast gate.

14. The damping charging device as claimed in claim 13, wherein the fast diode is a Schottky diode.

15. The damping charging device as claimed in claim 9, wherein the silicon steel core and the amorphous silicon core are bar-shaped.

16. The damping charging device as claimed in claim 9, wherein the silicon steel core and the amorphous silicon core are closed-loop.

* * * * *